(12) United States Patent
Watson et al.

(10) Patent No.: US 9,009,071 B1
(45) Date of Patent: Apr. 14, 2015

(54) SYSTEM AND METHOD FOR PROVIDING A LIVE REGISTER RECEIPT

(71) Applicants: James Christopher Watson, San Antonio, TX (US); Gina Smith, Boerne, TX (US)

(72) Inventors: James Christopher Watson, San Antonio, TX (US); Gina Smith, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 13/722,602

(22) Filed: Dec. 20, 2012

Related U.S. Application Data

(60) Provisional application No. 61/596,601, filed on Feb. 8, 2012.

(51) Int. Cl.
  *G07G 1/12* (2006.01)
  *G07G 5/00* (2006.01)
  *G06Q 20/20* (2012.01)

(52) U.S. Cl.
  CPC .................... *G06Q 20/202* (2013.01)

(58) Field of Classification Search
  None
  See application file for complete search history.

(56) References Cited

U.S. PATENT DOCUMENTS

| 2003/0055733 | A1* | 3/2003 | Marshall et al. | 705/24 |
| 2004/0064373 | A1* | 4/2004 | Shannon | 705/24 |
| 2012/0284130 | A1* | 11/2012 | Lewis et al. | 705/16 |

* cited by examiner

Primary Examiner — Paul Danneman
(74) Attorney, Agent, or Firm — Brinks Gilson & Lione

(57) ABSTRACT

A method and system for providing synchronous display at a customer mobile device of a vendor point of sale register receipt in the process of being created is disclosed. The method may include, at a customer mobile wireless device, initiating a live register receipt application and authentication process with a live register receipt provider, receiving and forwarding unique vendor register identification information and forwarding that information to the live register receipt provider. In response the customer mobile device receives and displays line item data from the identified vendor register via the provider in real-time. The system may include a customer mobile device configured to implement the live register receipt functionality described and a live register receipt provider configured to communicate live register data from vendor registers and mobile devices.

20 Claims, 7 Drawing Sheets

SYSTEM AND METHOD FOR PROVIDING A LIVE REGISTER RECEIPT

CROSS-REFERENCE TO RELATED APPLICATIONS

This application claims the benefit of U.S. Provisional App. No. 61/596,601, filed Feb. 8, 2012, the entirety of which is hereby incorporated herein by reference.

TECHNICAL FIELD

The disclosed embodiments relate to computer systems and communications relating to purchases. More particularly, systems and methods are provided for synchronizing display of data during a purchase transaction and delivery of an electronic receipt to mobile customer devices.

BACKGROUND

An existing method of handling generation of a receipt at a vendor is for the vendor to tally up the items and their costs for a customer and generate a paper receipt on a register at the vendor location. After entering in all the items to be purchased, and receiving whatever form of payment the vendor accepts, the paper receipt is typically printed off and handed to the customer. For a typical wireless payment via a smart phone, the vendor completes the bill to be paid and then the phone obtains transaction identification information necessary to make payment.

In some instances, the vendor may have a second display at the register oriented toward the customer to view as the items the customer is purchasing are rung up for purchase. Such a display is typically part of the vendor's register and is restricted to the location of the vendor's equipment. In some other instances, electronic versions of completed receipts may be emailed to a customer designated email address after completion of a transaction.

SUMMARY

According to a first aspect of the invention, a method for transmitting transaction data is disclosed where, in a wireless communication device having a display and a processor in communication with the display, the processor initiates a live register receipt application in response to a user input. The processor obtains point of sale vendor register identification information and transmits the point of sale vendor register identification information to a live register receipt provider. Responsive to transmitting the point of sale vendor register information, the processor receives from the live register receipt provider, and displays on the display of the wireless communications device, line item data for goods or services being purchased at the point of sale vendor register synchronously with entry at the point of sale vendor register of the line item data for the goods or services being purchased. In other embodiments, a final receipt may be received and stored at the wireless communication device from the live register receipt provider synchronously with acknowledgement of payment by the point of sale register. A wireless communication device configured to implement this method is also disclosed.

According to another aspect, a method for transmitting transaction data for a live register receipt includes, in a system having a memory in communication with a processor, the processor receiving a request to initiate a live register receipt function from a customer mobile device. The processor then receives point of sale vendor register identification information from the customer mobile device. The processor of the system also receives point of sale vendor register data, the data comprising line item data having a description and a price for goods or services entered into the point of sale vendor register. As the point of sale vendor register data is received, the processor transmits the data to the customer mobile device, when the point of sale vendor register data is from a point of sale vendor register associated with the point of sale vendor register identification information received from the authenticated customer mobile device. A system for implementing this method is also disclosed.

According to another aspect, a method for transmitting transaction data for a live register receipt includes, in a system having a memory in communication with a processor, the processor receiving a request to initiate a live register receipt function and authenticating a customer mobile device. The processor then receives point of sale vendor register identification information from the authenticated customer mobile device. The processor of the system also receives point of sale vendor register data, the data comprising line item data having a description and a price for goods or services entered into the point of sale vendor register. As the point of sale vendor register data is received, the processor transmits the data to the authenticated customer mobile device, when the point of sale vendor register data is from a point of sale vendor register associated with the point of sale vendor register identification information received from the authenticated customer mobile device. A system for implementing this method is also disclosed. In another embodiment, a final receipt from the point of sale vendor register may be received from the vendor register, sent to the customer mobile device and stored in a database by the system.

DETAILED DESCRIPTION

Figure 1:
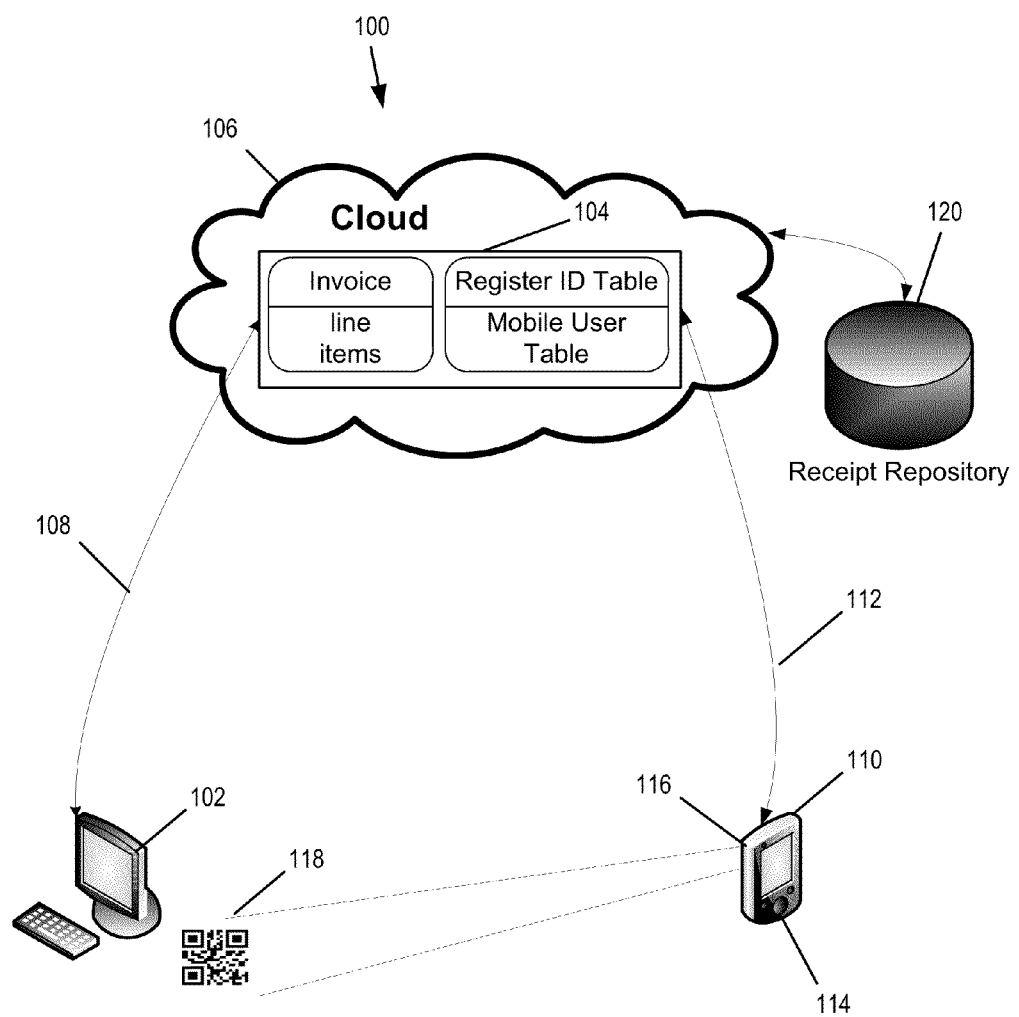
FIG. 1 illustrates a network implementation of one embodiment of a live register receipt system.

FIG. 1 illustrates, according to one embodiment, an implementation of a system 100 for live register receipt functionality for a customer of a vendor. In the simplified system 100, a vendor register 102 communicates with a live register receipt provider 104 which may be one or more computers in a network cloud 106. Communication between the vendor register 102 and the live register receipt provider 104 is preferably over a secure data link 108. For example, the vendor point of sale register 102 may communicate over a dedicated hardwire or wireless connection. Any of a number of types of secure data lines, from dedicated dialup lines to leased lines, internet communications using SSL or other security mechanisms, T1 lines or fractional T1 lines, or secure wireless formats are contemplated.

The vendor register 102 may be any computerized terminal, fixed or mobile, stand-alone or networked, that is capable of communicating with the live register receipt provider 104 over the secure data link 108 to provide substantially real-time information on an active transaction taking place between a customer and the vendor at the vendor register 102. The live register receipt provider 104 may be a standalone or networked group of computers within a network cloud 106. It is contemplated that the vendor for whom the point of sale vendor register 102 is connected has a preexisting agreement with the live register receipt provider 104 to process and transmit transaction data and final receipts in substantially real-time to appropriate customers of the vendor.

A customer mobile device 110 preferably includes wireless communication capabilities to create a wireless link with the live register receipt provider 104 over a secure wireless channel 112. The customer mobile computing device 110 may be a smart phone, tablet device or other processor enabled device. The customer mobile device 110 may include any of a number of data input mechanisms such as keypads 114, cameras 116, voice recognition mechanisms and other data entry formats. Each point of sale vendor register 102 for the vendor preferably includes a unique register identifier 118 accessible to the user of the mobile device 110. In the example of FIG. 1, the point of sale register identifier 118 may be a barcode-type identifier, such as the illustrated QR code, or other visually accessible code or indicia suitable for scanning. In other embodiments, the register identifier 118 may be obtained by the customer mobile device 110 via a wireless communication between the vendor register 102 and the customer mobile device 110, for example over a Bluetooth, near field communication (NFC), or other wireless communication mechanism.

The register identifier preferably uniquely identifies the register at the vendor such that the live register receipt provider 104 may match up the customer mobile device 110 with the correct vendor and vendor register 102 using the register identifier 118 information provided from the customer mobile device 110. In one embodiment, the live register receipt provider 104 includes a register ID table and a mobile user table that allow the provider 104 to match up the vendor and vendor register with the customer mobile device so that the invoice being created at the identified vendor register is connected to the correct mobile device and the line items being sent by the vendor register are automatically forwarded, with any necessary protocol and formatting corrections, from the provider 104 to the mobile device 110 as they arrive at the live register receipt provider 104.

Figure 2:
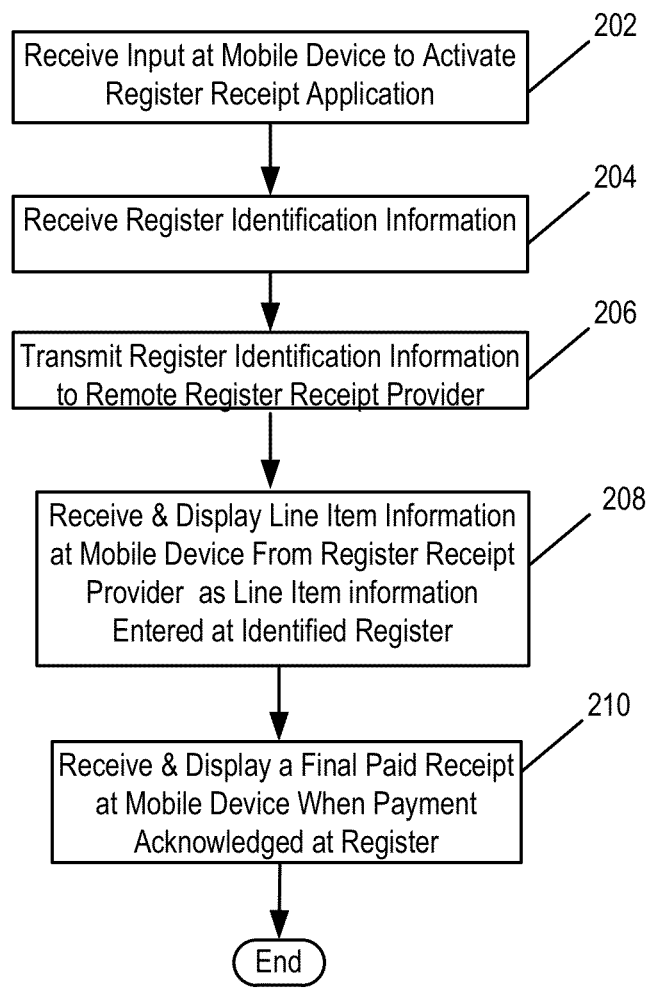
FIG. 2 illustrates a flow chart of one embodiment of providing a live register receipt function to a mobile device.

Referring to FIG. 2, the live register receipt process may begin when the customer approaches a point of sale location with a vendor point of sale computer and the customer activates an application on his or her mobile device 110 activating the live register receipt application software on the mobile device 110 (at step 202). As part of the activation step, the live register receipt provider may authenticate the customer mobile device 110 via any of a number of authentication methods. For example, the live register receipt provider 104 may utilize unique hardware or software codes from the customer mobile device 110, may require a customer login and password, or may utilize a combination of both device-specific and user specific information in the authentication process. In other embodiments, no authentication process is necessary by the customer or customer device in order to receive the live register receipt information from the vendor. For example, a vendor may provide the live register receipt to customers as a courtesy application run entirely in-store.

Once the live register receipt application is active on the mobile device 110 and (optionally) the user has been authenticated, the mobile device 110 obtains unique vendor register identification information (at step 204) that the mobile device 110 will then transmit to the live register receipt provider 104 to link up the register activity at that particular point of sale vendor register 102 with the customer's mobile device 110 (at step 206). In order to obtain the unique register identification 118, such as the illustrated QR code, the mobile device 110 may use the camera 116 to scan the image and then forward the image, or a translation of the image into another format, over the wireless connection 112 to the live register receipt provider 104. Although a scannable image 118 is illustrated as containing the unique register identification information, any of a number of forms of identification may be entered, either through scanning with the camera 116 of the mobile device 110, data entry manually applied through a keypad 114 of mobile device 110, audible commands received at the mobile device 110, or any of a number of other data transfer means such as Bluetooth, RF (Near Field Communication), or other communication mechanisms noted previously.

Once the software application for live register receipt has been activated on the customer's mobile device 110 and the unique register identification information 118 have been provided to the live register receipt provider 104, the information entered by a vendor at the point of sale register 102 is automatically forwarded to the live register receipt provider 104, which matches up that data with the unique register identification information and mobile device 110 associated with that unique register identification information to forward, in substantially real time, line by line entries as they are entered into the point of sale vendor register 102. The mobile device 110 receives and displays this line item information from the register receipt provider 104 as it is entered at the identified point of sale register so that the user of the mobile device 110 can see items and charges accumulate in real time (at step 208).

A live-action running total view of the in-process register receipt allows the customer to validate that items being scanned are being scanned correctly onto their bill prior to payment. The live-action and persistent display of in-process invoice information may allow a customer to spot errors in prices or items, such as duplicate entries. In one embodiment, the in-process invoice may be scrolled through at the mobile device 110 as more line items are entered when the line items are more than will fit on the display at one time. In one embodiment, the customer's mobile device 110 will also receive and display a final paid receipt at the mobile device when the customer pays the vendor and the vendor acknowledgment of receipt of payment is entered at the point of sale vendor register 102. For example, if the customer with the mobile device 110 purchases the items using cash or a standard credit or debit card, such as with a credit/debit card physically presented to the vendor that is swiped by the vendor or for which the vendor enters in the account number at the vendor register 102, the acknowledgment of payment may be entered by the sales person at the point of sale vendor register 102. That payment information then finalizes the receipt at the live register receipt provider 104 and the electronic version of that finalized receipt with indication of payment being received is forwarded to the mobile device 110 for display and storage on the mobile device (at step 210).

In one embodiment, the line item information already displayed on the mobile device 110 for the in-process receipt is updated to reflect that the receipt is final and all amounts owed have been paid. This may be illustrated with a unique code provided by the vendor register 102 and/or the live register receipt provider 104 that may take the form of displayed text and/or a token or encryption key that is saved electronically as part of the receipt to verify authenticity. A copy of the final receipt may then be sent to a receipt repository database 120 contained by the live register receipt provider and/or the vendor.

Figure 3:
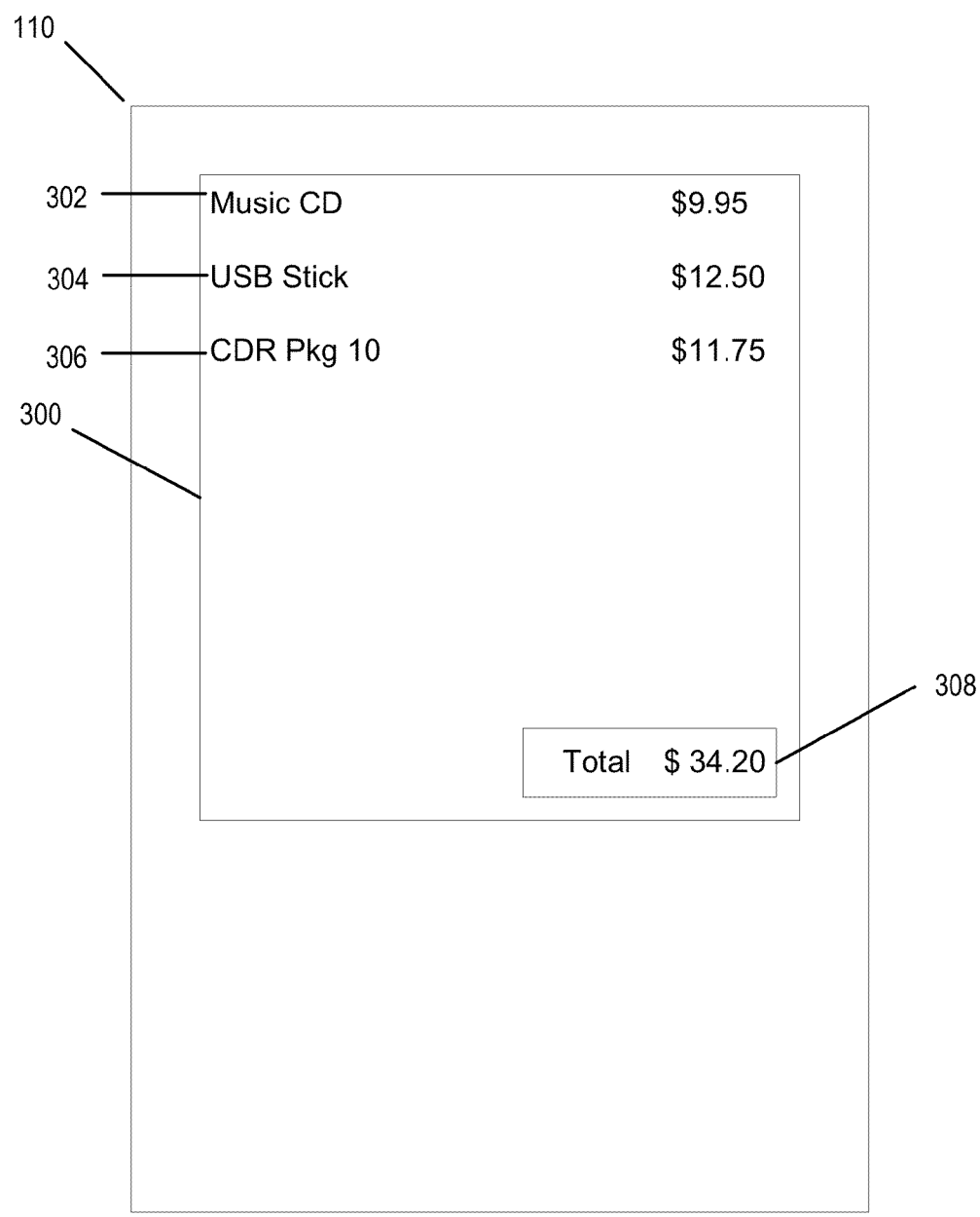
FIG. 3 illustrates a screenshot of a mobile device providing real-time line item display of items being purchased at a register.

As illustrated in FIG. 3, sample display screen 300 of the mobile device 110 is illustrated. The sample display screen receiving the line by line information from the live register receipt provider displays an item description and price for each item as it is being scanned in. For example, the first item 302 of a music CD will be displayed with a price of $9.95, a second line item 304 of a USB stick may be listed at a price of $12.50 and a third line item 306 of a CDR package may be listed at $11.75, each being presented as it is scanned and showing up in real time on the customer's mobile device as the vendor employee at the point of sale register enters the item in the invoice that is being created. A running total 308 may be presented on the display screen 300 so that the customer sees, in real time, the accumulating charges as products or services are recorded at the vendor register 102. The placement of the running total 308 may be located in any number of locations on the display screen 300, for example at the top or at the bottom of the display screen 300.

In the embodiment of FIGS. 1-3, a stand-alone live register receipt system 100 has been described where the customer can receive a synchronized view of the cash register receipt on his or her mobile device in line item detail allowing monitoring of items being added to the receipt and also permitting the customer to, after payment has been provided, walk away with an electronic copy of a complete and acknowledged receipt. In one embodiment, the live register receipt is a stand-alone application that may be facilitated by a live register receipt provider 104 independent of any particular vendor system, payment system or bank. The live register receipt provider 104 maintains agreements with the various vendors that wish to provide this service to their customers and establishes communication protocols and protections that the vendor uses to communicate register identification and line item information. On the customer side, the live register receipt provider utilizes a software application previously obtained by the customer mobile device 110, or downloaded from the live register receipt provider 104, and authenticates the device 110 and/or the user of the device. The software application on the customer mobile device may include the necessary protocols and protections that the customer device must use to communicate with the live register receipt provider 104. An advantage of the live register receipt arrangement described above is that, prior to initiating any payment system activity, and before a transaction is completed at the point of sale vendor register 102, a customer mobile device can receive line item information synchronized with the input of that information at the point of sale vendor register so that information is displayed on the mobile device as the receipt is being created. Another advantage is that the customer may then make a payment and leave the vendor's premises with a final electronic receipt already stored on the customer's mobile device 110.

Figure 4:
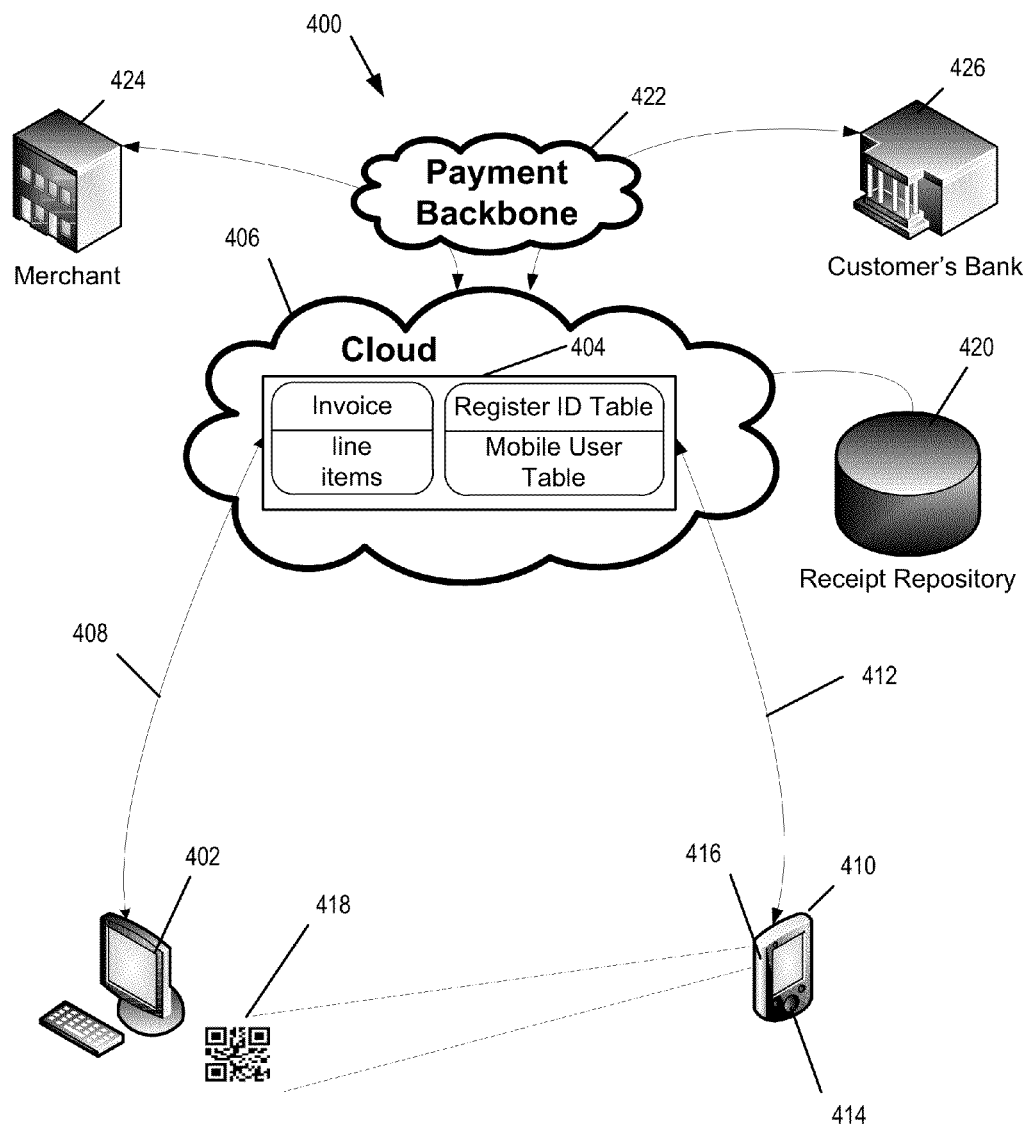
FIG. 4 illustrates an alternative network implementation to FIG. 1 combining a live register receipt system and a backbone payment system.
Figure 5:
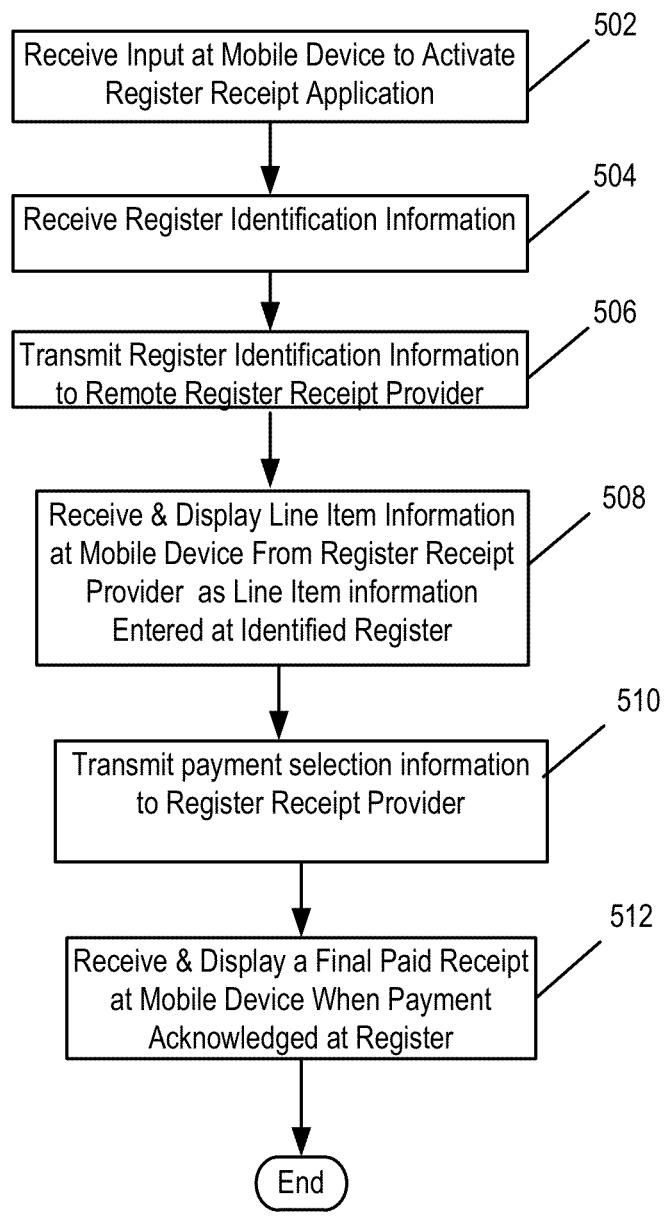
FIG. 5 illustrates a flow chart of an embodiment where a payment function is appended to the live register receipt function according to one embodiment.

In another embodiment, as illustrated in FIG. 4, the live register receipt functionality may be used in concert with, or integrated in, different applications on a customer mobile device, for subsequent automatic payment by mobile payment applications. The system 400 of FIG. 4 is substantially identical to that of FIG. 1 with the exception of the payment backbone network 422 and vendor and customer bank 424, 426. In the embodiment of FIG. 4, where the live register receipt application and the live register receipt provider 404 may be in communication with a payment backbone system 422 such as a credit card or debit card processing facility, the mechanism for engaging the live register receipt may be the same as described with respect to FIGS. 1-3, however it may be integrated in an application that also permits a customer with a mobile device 410 to, at the conclusion of items being scanned in at the point of sale register 402, make a purchase directly from the portable device 410. Referring to the method illustrated in FIG. 5, the device 410 may receive an input from the user to activate the live register receipt application, which may now be part of a mobile wallet or other mobile payment system (at 502). The mobile device 410 may use a camera 416 or other image capture or scanning mechanism to obtain the register unique identification information 418 such as a QR code. Information may be transmitted by the mobile device 410 over a secure wireless connection 412 to the live register receipt provider 404 so that the live register receipt provider 404 may match up activity at the appropriate vendor point of sale register 402 with the correct customer and mobile device 110 (at steps 504, 506). Subsequently, any information entered or scanned at the point of sale vendor register 402 would be transmitted to the mobile device 410 via the live register receipt provider 404 (at step 508).

At the conclusion of entry of all items for purchase at the point of sale register 402, the customer may enter, at the mobile device, a payment selection choice from the mobile device 110. The payment selection choice may be to pay by cash at which point the rest of the transaction would be concluded by hand and the finalized receipt would be acknowledged by the point of sale register 402 and transmitted through the live register receipt provider 404 to the mobile device 410 as described with respect to FIGS. 1-3. Alternatively, a wireless payment application that the live register receipt functionality is integrated with or cooperatively works with may be invoked on the mobile device 410. For example, if the customer with the mobile device 410 has a mobile wallet with a credit card payment software application, that credit card application may be selected for paying the total amount illustrated on the in-process receipt displayed on the display of the mobile device 410 through the live register receipt function (at step 510). The live register receipt provider 404 would communicate with the payment backbone 422 for the payment provider invoked by the selected software application on the mobile device 410. Using this payment backbone, which again may be any debit/credit, ATM network, or other payment network, the vendor bank 424 and the customer bank 426 may then be appropriately credited or debited with the amount owed and confirmation may be provided back to the live receipt provider 404 so that the point of sale register 402 at the vendor will acknowledge payment and a paid finalized register receipt may be electronically sent to the device 410 in real time (at step 512).

In yet other embodiments, the line items of the in-process receipt presented to the customer on the mobile device 410 may allow for individual selection of line items so that different payment mechanisms may be used for each line item. For example, a first line item may be associated with a mobile credit card payment, a second line item may be designated for payment by cash directly to the cashier, and a third line item may be designated for another payment mechanism, such as a debit card. In yet other implementations, payment mechanisms such as reward points from banks or other financial institutions may be used to proceed with payment for one or more items listed on the in-process receipt displayed at the mobile device 410.

Figure 6:
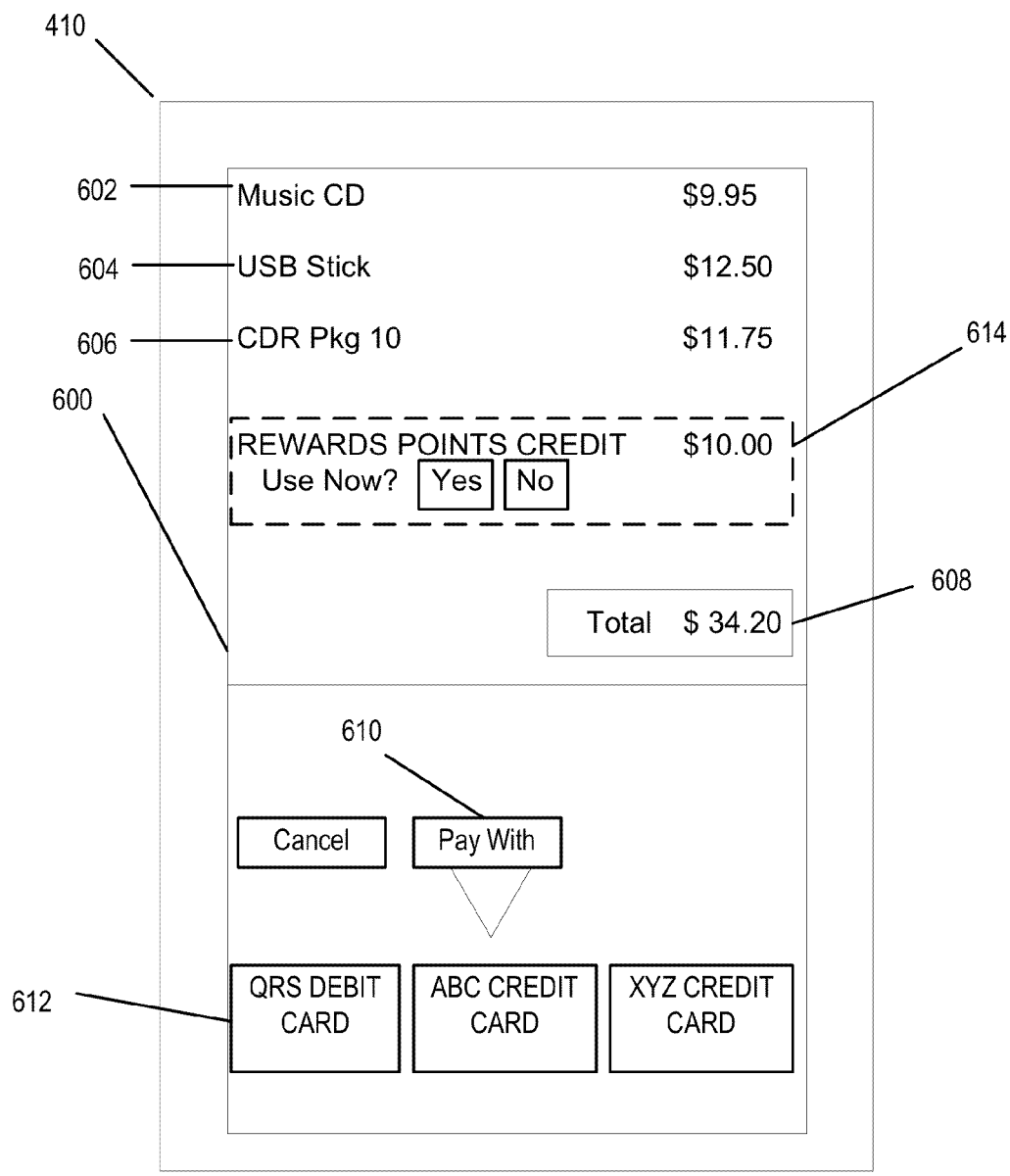
FIG. 6 illustrates a screenshot of a mobile device providing both real-time display of items being purchased at a register and a payment function for paying an amount owed from a selected source.

A sample display 600 of a mobile device 410 configured to execute a live register receipt application in cooperation with a mobile payment application, where the live register receipt application may be integrated into a mobile wallet from a provider that provides one or more payment options, is shown in FIG. 6. The version of the display 600 in FIG. 6 shows a large touchscreen area displaying multiple icons in a bottom portion and data relating to the in-process or completed receipt in the upper portion, where one or more icons may be touched or clicked on. Any of a number of configurations of touch screen displays, displays without touch screens and input mechanisms such as pointing devices or keys, in any of a number of combinations, may be used to implement the functions described herein. As with the embodiment of FIG. 3, the display 600 of the mobile device 410 in FIG. 6 is configured to display each line item 602, 604 and 606 as they are being entered at a point of sale vendor register. A running total 608 may be displayed as well that changes as items are added or removed, or as various credits or charges such as taxes are added or subtracted during the real-time creation of a register receipt.

As with the embodiment of FIGS. 1-3, the live register receipt application may be initiated by the customer at his or her mobile device 410 upon arrival at the vendor, or at the specific point of sale vendor register, before any items have been rung up, or while the items are being rung up. As soon as the mobile device and/or user has been authenticated and the mobile device obtains and forwards the unique point of sale register identification information to the live register receipt provider, the provider may look up the identified vendor register and immediately forward line item information as it is received to the mobile device. These activities occur prior to the completion of the register receipt and before any payment is due, thus there is no need for the customer to separately initiate a connection to their bank for wireless payment, at this point, if that form of payment is to be used. Instead of waiting until after a bill is ready for payment and then proceeding through a handshake and authentication process with a financial institution after the bill is created, the customer using a live register receipt application and system such as described herein completes handshake and authentication activities with the live register receipt provider prior to being ready to pay. In some contemplated embodiments, the same handshake and authentication process for initiating the live register receipt functions may also be recognized or used by the payment backbone system later selected by the customer via the mobile device to help accelerate the payment process. In other embodiments, the handshake and authentication with the financial institution selected for wireless payment may be completely separate from that of the live register receipt system and only data on the total amount owed, or selected amount, may be shared between the payment backbone and the live register receipt provider.

At the completion of the entry of line item information, for example by the employee at the vendor register, the customer may then select from one or more payment options such as various payment source icons 612 that will link the amount of the invoice to the payment backbone (i.e. the wireless payment system supporting the customer selected wireless payment icon) by moving the selected payment icon below a "pay with" icon 610 and pressing the "pay with" icon 10 so that the vendor may be paid via the payment backbone and a final receipt issued by the live register receipt provider. In different embodiments, as noted above, the customer may select individual line items for payment with different accounts so that different groups of line items may be paid with different accounts in the same transaction. Although the payment source icons 612 are shown as debit or credit accounts, other payment source icons for loyalty points and rewards programs, for cash payment at the register, for standard swiped credit card payment at the register, or any other payment mechanisms acceptable to the vendor, may be available and accessible for selection by the customer at the mobile device 410. Also, in one embodiment, the display 600 may only show the icons 610, 612 as greyed out or non-functional until the vendor register enters information that the invoice is completed and ready for payment. Any of a number of user interface configurations, and not just the specific touch screen button arrangement described above, may be implemented on the mobile device, to allow user access to the live register receipt functions and payment services supported by the customer's mobile device.

In other embodiments, the live register receipt provider may automatically provide the mobile device with data to display to the customer regarding reward points or discounts the customer may want to use for payment or take advantage of while the receipt is being generated. For example, a rewards points program reminder 614 may be presented on the mobile device display 600 that provides a monetary credit or other points or incentive option that may be used by the customer if they select to apply the credit or other incentive to the transaction. The rewards points reminder 614 may be presented as a line item on the in-process receipt shown on the customer mobile device display, for example at the time the vendor register indicates that the invoice is ready for payment, so that the customer has the ability to redeem rewards points or other incentive available as part of the decision process of what payment resource(s) to use. The rewards points reminder and participation may be, in one implementation, controlled by the live register receipt provider based on customer information as to what rewards programs the customer is part of. This information may be maintained in a database within the live register receipt provider network or a third party network that the live register receipt provider is in communication with. Alternatively, the rewards points program reminder 614 may be initiated by a specific financial institution in the payment backbone when the customer selects a payment source, for example by selecting a payment source icon 612.

In yet another embodiment, the live register receipt provider 104, 404 may provide real-time register activity information to more than just the customer mobile device 110, 410 for the customer that is present at the vendor register. The live register receipt provider may be configured to transmit the real-time register information, and/or the final receipt, to one or more other mobile devices. The additional mobile device may be pre-authorized to receive this information by the customer by prior registration with the live register receipt provider so that any activation of the live register receipt function at the customer mobile device will cause the live register receipt provider to look-up any other mobile devices associated with the customer mobile device, for example in a look-up table at the live register receipt provider, so a second communication channel will automatically be set-up to the additional mobile device. The transmission of live register receipt information may permit a parent in a different location (e.g. in another part of a shopping mall) to monitor the shopping activities of his or her child. In one variation of this embodiment, the additional mobile device may be required to authorize any payment of the amount due on the customer mobile device before a transaction may be finalized, or to actually make the payment from the additional mobile device.

Any of a number of communication security mechanisms may be used for the transmission of live register information between the vendor register and the computer or computers of the live register receipt provider, between the mobile device and the live register receipt provider and for the actual purchase transaction. In one embodiment of the invention, digital signatures may play a large part of the security scheme. DSA (Digital Signature Algorithm), a variant thereof (e.g., ECDSA or Elliptical Curve DSA), RSA or other digital signature protocol may be used. Symmetric cryptographic schemes such as DES (Digital Encryption Standard) may also be applied in the same or different embodiments. Message authentication codes may be used to verify the integrity and authenticity of messages exchanged between the various parties communicating with one another.

The illustrated systems may communicate with customers and merchants through various types of communication media. Communications lines may include a traditional wired network and/or a wireless network usable by portable devices such as portable computers, smartphones, etc. Illustratively, vendor registers and customer smart phones or portable computing devices may be configured to communicate with each other or a bank or third party financial services system independently and autonomously. The smart phone may be operated to receive in-process receipt information, final receipt data and to conduct a purchase transaction at the point or sale. The smart phone may include a wallet application that allows the customer to access his or her account balance(s) while connected to a payment system backbone or bank and to the live register receipt provider.

Figure 7:
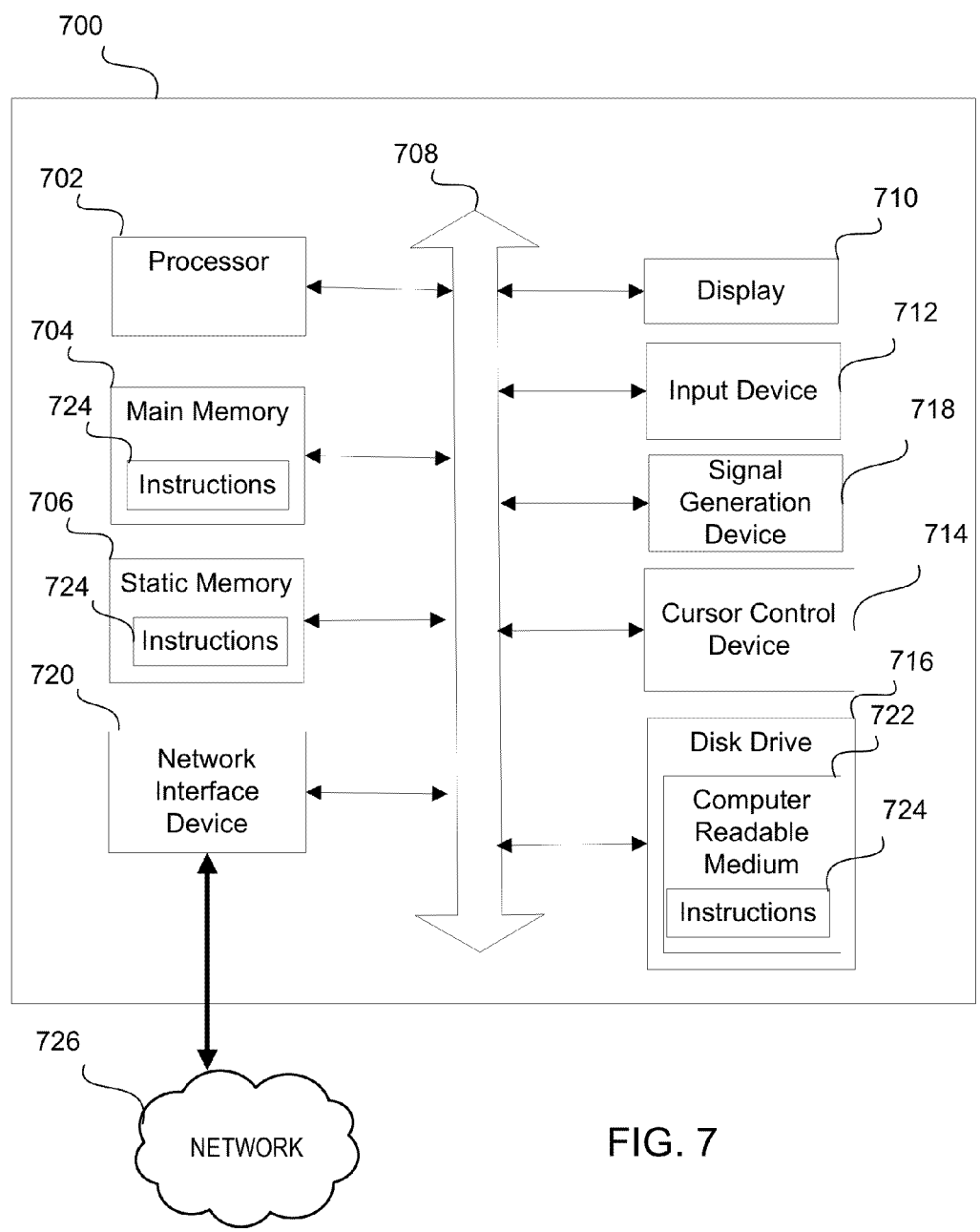
FIG. 7 illustrates a computer system which may be implemented as one or more parts of the system illustrated in the network of FIG. 1.

Referring to FIG. 7, an illustrative embodiment of a general computer system that may be used for one or more of the components shown in FIGS. 1-6, or in any other financial transaction system configured to carry out the methods discussed above, is shown and is designated 700. The computer system 700 can include a set of instructions that can be executed to cause the computer system 700 to perform any one or more of the methods or computer-based functions disclosed herein. The computer system 700 may be mobile or non-mobile, operate as a stand-alone device, or may be connected using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, such as a central processing unit ("CPU"), a graphics processing unit ("GPU"), or both. Moreover, the computer system 700 can include a main memory 704 and a static memory 706 that can communicate with each other via a bus 708. As shown, the computer system 700 may further include a video display unit 710, such as a liquid crystal display ("LCD"), an organic light emitting diode ("OLED"), a flat panel display, a solid state display, or a cathode ray tube ("CRT"). Additionally, the computer system 700 may include one or more input devices 712, such as a keyboard, scanner, digital camera or audio input device, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Embodiments the methods disclosed herein can be implemented on existing financial services systems and/or other known financial industry systems. Both financial transaction systems and other known financial industry systems utilize a combination of computer hardware (e.g., client and server computers, which may include computer processors, memory, storage, input and output devices, and other known components of computer systems; electronic communication equipment, such as electronic communication lines, routers, switches, etc.; electronic information storage systems, such as network-attached storage and storage area networks) and computer software (i.e., the instructions that cause the computer hardware to function in a specific way) to achieve the desired system performance. A system and method for providing a simultaneous, real-time view at a mobile device of a pending invoice in the process of being created has been disclosed. The mobile device may connect to the live register receipt provider prior to or while the invoice is being built. Line item by line item entries are sent by a vendor register to a live register receipt provider that immediately forwards the data to the authenticated mobile device of a customer at the vendor register. After the completion of the invoice, the customer may present payment, manually or through the mobile device, and then receive a final receipt at the mobile device in real time. The live register receipt functionality may be implemented as a separate and independent function or integrated with a mobile wallet or specific wireless payment backbone system.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method for transmitting transaction data comprising:
   in a wireless communication device having a display and a processor in communication with the display, the processor:
      responsive to a user input, initiating a live register receipt application;
      obtaining point of sale vendor register identification information associated with a point of sale vendor register;
      transmitting the point of sale vendor register identification information to a live register receipt provider; and
      in response to transmitting the point of sale vendor register identification information, receiving from the live register receipt provider, and displaying on the display of the wireless communication device, line item data for goods or services being purchased at the point of sale vendor register synchronously with entry at the point of sale vendor register of the line item data for the goods or services being purchased.

2. The method of claim 1, wherein obtaining the point of sale vendor register information comprises capturing an image of a unique point of sale vendor register identifier.

3. The method of claim 2, wherein the unique point of sale register identifier comprises a two dimensional bar code.

4. The method of claim 1, further comprising receiving and storing a final receipt from the live register receipt provider synchronously with acknowledgement of payment by the point of sale vendor register.

5. The method of claim 1, further comprising displaying on the display of the mobile device, in real time, a running total of charge data as items are being entered at the point of sale register.

6. A wireless communication device comprising:
   a display; and
   a processor in communication with the display, the processor configured to:
      responsive to a user input, initiate a live register receipt application;
      obtain point of sale vendor register identification information associated with a point of sale vendor register;
      transmit the point of sale vendor register identification information to a live register receipt provider; and
      in response to transmitting the point of sale vendor register identification information, receive from the live register receipt provider, and display on the display of the wireless communication device, line item data for goods or services being purchased at the point of sale vendor register synchronously with entry at the point of sale vendor register of the line item data for the goods or services being purchased.

7. The wireless communication device of claim 6, wherein obtaining the point of sale vendor registration information comprises capturing an image of a unique point of sale vendor register identifier.

8. The wireless communication device of claim 7, wherein the unique point of sale register identifier comprises a two dimensional bar code.

9. The wireless communication device of claim 6, wherein the processor is further configured to receive and store a final receipt from the live register receipt provider synchronously with acknowledgement of payment by the point of sale vendor register.

10. The device of claim 6, wherein the processor is further configured to display on the display of the mobile device, in real time, a running total of charge data as items are being entered at the point of sale register.

11. A method for transmitting transaction data comprising:
    in a system having a memory in communication with a processor:
       receiving a request to initiate a live register receipt function and authenticating a customer mobile device;

receiving point of sale vendor register identification information from the authenticated customer mobile device;

receiving line item data from a point of sale vendor register associated with the received point of sale vendor register identification information as the line item is being entered at the point of sale vendor register, the line item data having a description and a price for goods or services entered into the point of sale vendor register; and transmitting the received line item data to the authenticated customer mobile device as the line item data is received, such that the authenticated customer mobile device is sent the line item data in real time as each line item is being entered at the point of sale register.

12. The method of claim 11, wherein the point of sale vendor register identification information comprises an image of a unique point of sale vendor register identifier.

13. The method of claim 12, wherein the unique point of sale register identifier comprises a two dimensional bar code.

14. The method of claim 11, further comprising:

receiving and transmitting a final receipt to the customer mobile device synchronously with receiving acknowledgement of payment by the point of sale vendor register; and storing a copy of the final receipt in a receipt database in communication with the processor.

15. The method of claim 14, wherein receiving and transmitting the final receipt comprises transmitting a unique code to the customer mobile device indicating that payment has been received for the goods or services identified by previously transmitted line item data.

16. A system for facilitating display of a live register receipt on a mobile communication device, the system comprising:

a memory; and a processor in communication with the memory, the processor configured to:

receive a request to initiate a live register receipt function and authenticate a customer mobile device;

receive point of sale vendor register identification information from the authenticated customer mobile device;

receive line item data from a point of sale vendor register associated with the received point of sale vendor register identification information as the line item is being entered at the point of sale vendor register, the line item data having a description and a price for goods or services entered into the point of sale vendor register; and transmit the received line item data to the authenticated customer mobile device as the line item data is received, such that the authenticated customer mobile device is sent the line item data in real time as each line item is being entered at the point of sale register.

17. The system of claim 16, wherein the point of sale vendor register identification information comprises an image of a unique point of sale vendor register identifier.

18. The system of claim 17, wherein the unique point of sale register identifier comprises a two dimensional bar code.

19. The system of claim 16, wherein the processor is further configured to:

receive and transmit a final receipt to the customer mobile device synchronously with receiving acknowledgement of payment by the point of sale vendor register; and store a copy of the final receipt in a receipt database in communication with the processor.

20. The system of claim 19, wherein to receive and transmit the final receipt, the processor is further configured to transmit a unique code to the customer mobile device indicating that payment has been received for the goods or services identified by previously transmitted line item data.

* * * * *